US012611845B2

(12) United States Patent
Hidani et al.

(10) Patent No.: US 12,611,845 B2
(45) Date of Patent: Apr. 28, 2026

(54) BASE MATERIAL FOR PRINTED CIRCUIT, PRINTED CIRCUIT, AND METHOD OF MANUFACTURING BASE MATERIAL FOR PRINTED CIRCUIT

(71) Applicant: SUMITOMO ELECTRIC INDUSTRIES, LTD., Osaka (JP)

(72) Inventors: Takuto Hidani, Osaka (JP); Kousuke Miura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 267 days.

(21) Appl. No.: 18/029,128

(22) PCT Filed: Oct. 4, 2021

(86) PCT No.: PCT/JP2021/036551
§ 371 (c)(1),
(2) Date: Mar. 29, 2023

(87) PCT Pub. No.: WO2022/075239
PCT Pub. Date: Apr. 14, 2022

(65) Prior Publication Data
US 2023/0371176 A1      Nov. 16, 2023

(30) Foreign Application Priority Data

Oct. 9, 2020    (JP) ................................. 2020-171170

(51) Int. Cl.
*B32B 15/00*        (2006.01)
*B32B 15/08*        (2006.01)

(52) U.S. Cl.
CPC .............. *B32B 15/00* (2013.01); *B32B 15/08* (2013.01)

(58) Field of Classification Search
CPC ................................. B32B 15/00; B32B 15/08
USPC ......................................................... 428/209
See application file for complete search history.

(56) References Cited

U.S. PATENT DOCUMENTS

| | | | | |
|---|---|---|---|---|
| 5,922,397 A | * | 7/1999 | Brandt ................... | H05K 3/246 |
| | | | | 427/98.8 |
| 2012/0061130 A1 | | 3/2012 | Yoshi et al. | |
| 2017/0290150 A1 | | 10/2017 | Kasuga et al. | |
| 2017/0347464 A1 | | 11/2017 | Hashizume et al. | |
| 2018/0014403 A1 | * | 1/2018 | Kasuga ................... | H05K 3/245 |
| 2018/0124925 A1 | * | 5/2018 | Hashizume ............ | H05K 1/097 |
| 2019/0008035 A1 | * | 1/2019 | Okamoto .............. | H05K 1/181 |

(Continued)

FOREIGN PATENT DOCUMENTS

| | | |
|---|---|---|
| JP | 2003-124214 A | 4/2003 |
| JP | 2016-119424 A | 6/2016 |

(Continued)

*Primary Examiner* — Betelhem Shewareged
(74) *Attorney, Agent, or Firm* — Renner, Otto, Boisselle & Sklar, LLP

(57) ABSTRACT

A base material for a printed circuit of the present disclosure includes a base film containing polyimide as a main component, and a conductor layer formed on at least one surface of the base film. The conductor layer includes a metal sintered layer formed on the base film and an electroless plating layer formed on the metal sintered layer, and in the base film, a number of voids having a maximum width of 5 μm or more in plan view is 10 or less per a reference unit area of 0.25 mm² on a surface of the base film.

3 Claims, 7 Drawing Sheets

(56)          References Cited

U.S. PATENT DOCUMENTS

| | | |
|---|---|---|
| 2021/0014978 A1* | 1/2021 | Hashizume ............ H05K 3/022 |
| 2021/0022245 A1* | 1/2021 | Sugiura .................. H05K 1/092 |
| 2021/0153358 A1 | 5/2021 | Sakai et al. |
| 2023/0371176 A1* | 11/2023 | Hidani ................. H05K 1/0353 |

FOREIGN PATENT DOCUMENTS

| | | |
|---|---|---|
| JP | 2020-57799 A | 4/2020 |
| WO | 2010/095723 A1 | 8/2010 |
| WO | 2019/216012 A1 | 11/2019 |

\* cited by examiner

ENLARGED IMAGE (SCHEMATIC VIEW)
OF SURFACE OF BASE FILM

BASE MATERIAL FOR PRINTED CIRCUIT, PRINTED CIRCUIT, AND METHOD OF MANUFACTURING BASE MATERIAL FOR PRINTED CIRCUIT

TECHNICAL FIELD

The present disclosure relates to a base material for a printed circuit, a printed circuit, and a method of manufacturing a base material for a printed circuit. This application claims priority based on Japanese Patent Application No. 2020-171170 filed on Oct. 9, 2020, and the entire contents of the Japanese patent application are incorporated herein by reference.

BACKGROUND

PTL 1 discloses a base material for a printed circuit including a base film containing polyimide as a main component and a conductive layer.

The conductive layer of PTL 1 includes a first conductive layer formed by applying and firing conductive ink containing metal particles, and a second conductive layer formed on one surface of the first conductive layer by electroless plating.

The method of manufacturing a base material for a printed circuit disclosed in PTL 1 includes the steps of forming a first conductive layer by applying and firing conductive ink on one surface of a base film, forming a second conductive layer on the surface of the first conductive layer by performing electroless plating using palladium as a catalyst after forming the first conductive layer, and dispersing palladium in the base film by heat treatment after performing the electroless plating.

In PTL 1, the step of forming the second conductive layer by electroless plating includes a step of adsorbing palladium on the first conductive layer, and a step of depositing a metal such as copper to be the second conductive layer on the surface of the first conductive layer by immersing the laminate on which the first conductive layer is formed in an electroless plating solution.

PRIOR ART DOCUMENT

Patent Literature

PTL 1: Japanese Unexamined Patent Application Publication No. 2016-119424

SUMMARY

An aspect of the present disclosure is a base material for a printed circuit. The disclosed base material includes a base film containing polyimide as a main component, and a conductor layer formed on at least one surface of the base film. The conductor layer includes a metal sintered layer formed on the base film and an electroless plating layer formed on the metal sintered layer, and in the base film, a number of voids having a maximum width of 5 $\mu$m or more in plan view is 10 or less per a reference unit area of 0.25 mm$^2$ on a surface of the base film.

Another aspect of the present disclosure is a printed circuit. The disclosed printed circuit includes a base film containing polyimide as a main component, and a conductive pattern formed on at least one surface of the base film. The conductive pattern has a minimum conductor width and a minimum conductor spacing, one or both of the minimum conductor width and the minimum conductor spacing are 20 $\mu$m or less, the conductive pattern includes a metal sintered layer formed on the base film and an electroless plating layer formed on the metal sintered layer, and in the base film, a number of voids having a maximum width of 5 $\mu$m or more in plan view is 10 or less per a reference unit area of 0.25 mm$^2$ on a surface of the base film.

Another aspect of the present disclosure is a method of manufacturing a base material for a printed circuit. The disclosed method includes forming, on one surface of a base film containing polyimide as a main component, a first conductor layer which is a metal sintered layer, and forming, on the first conductor layer, a second conductor layer by electroless plating using a catalyst. The forming the second conductor layer includes depositing, on the first conductor layer, a conductor serving as the catalyst from an electroless plating solution by an electrolysis assist in which an electric potential is applied to the first conductor

DETAILED DESCRIPTION

Figure 1:
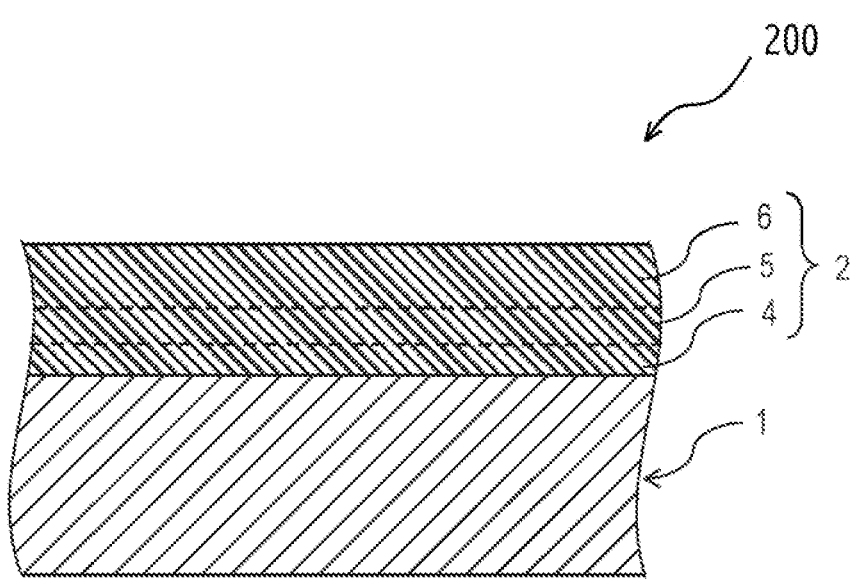
FIG. 1 is a schematic cross-sectional view of a base material for a printed circuit according to an embodiment.

Problems to be Solved by Present Disclosure

When a conductive layer is formed by electroless plating as in PTL 1, voids are generated in a base film containing polyimide as a main component. The void is a cavity generated inside the base film. The void is formed in the vicinity of the interface between the base film and the conductive layer to locally expand the surface of the base film.

The present inventors have found that voids present in a base film cause circuit defects in a printed circuit having a fine pattern. The void is relatively small at about several $\mu$m. For this reason, in the case of a normal printed circuit in which the conductor width or conductor spacing of the conductive pattern is sufficiently larger than the void, the presence of the void hardly causes a problem. However, in the case of a fine pattern, since a conductor width or a conductor spacing is fine, a circuit defect may occur due to the presence of voids. For example, in the case where the size of the void is equal to or larger than the width of the narrow conductor, if the conductor is present on the surface of the base film expanded by the void, the conductor may be peeled off to cause a conduction failure. In addition, insulation failure between the conductors may occur due to peeling of the conductors.

Therefore, it is desirable to suppress circuit defects in a base material for a printed circuit of a fine pattern including a base film containing polyimide as a main component and an electroless plating layer.

Advantageous Effects of Present Disclosure

According to the present disclosure, it is possible to suppress circuit defects of a printed circuit having a fine pattern.

Description of Embodiments of Present Disclosure (1) A base material for a printed circuit according to an embodiment includes a base film containing polyimide as a main component, and a conductor layer formed on at least one surface of the base film. The conductor layer includes a metal sintered layer formed on the base film and an electroless plating layer formed on the metal sintered layer, and in the base film, a number of voids having a maximum width of 5 μm or more in plan view is 10 or less per a reference unit area of 0.25 mm² on a surface of the base film. In particular, when the base material for a printed circuit according to the embodiment is used for a printed circuit of a fine pattern (for example, one or both of the minimum conductor width and the minimum conductor spacing are 20 μm or less), the number of voids that may cause circuit defects is small, and thus circuit defects in the printed circuit of the fine pattern can be suppressed. Here, the fine pattern has both or one of a minimum conductor width of 20 μm or less and a minimum conductor spacing of 20 μm or less. Hereinafter, the term "void" described in this specification refers to a void formed in the vicinity of the interface between the base film and the conductor layer in the base film, unless otherwise specified.

(2) The conductor layer may further include an electroplating layer or a metal foil layer on the electroless plating layer. The electroplating layer or the metal foil layer is further formed on the electroless plating layer. By forming the electroplating layer or the metal foil layer, the thickness of the entire conductor layer can be easily and accurately adjusted. The metal foil layer may be an ultra-thin metal foil layer, such as an ultra-thin copper foil layer.

(3) The number of voids may be 5 or less per the reference unit area. When the number of voids is smaller, circuit defects can be further suppressed.

(4) The base film does not contain palladium. "The base film does not contain palladium" means that the base film does not contain palladium at all, or the base film does not substantially contain palladium. "The base film does not substantially contain palladium" means that the base film does not contain palladium except for a content in which palladium is inevitably contained. The content inevitably contained is, for example, a content of from 0.05 ppm to 10 ppm obtained as a result of cutting out polyimide on the surface of the base film on the conductor layer side and performing ICP analysis. By not containing palladium, the occurrence of voids in the base film can be suppressed.

(5) In the base film, a height of a base film surface in a portion where a void is present relative to a base film surface in a portion where no void is present may be 1.5 μm or more. When the height of the void is 1.5 μm or more, a circuit defect is likely to occur due to the void, but when the number of voids is small as described above, the circuit defect is appropriately suppressed. Here, the height of void is measured by laser microscope observation of the surface of the base film from which the conductor layer has been removed.

(6) A printed circuit according to an embodiment includes a base film containing polyimide as a main component, and a conductive pattern formed on at least one surface of the base film. The conductive pattern has a minimum conductor width and a minimum conductor spacing, one or both of the minimum conductor width and the minimum conductor spacing are 20 μm or less, the conductive pattern includes a metal sintered layer formed on the base film and an electroless plating layer formed on the metal sintered layer, and in the base film, a number of voids having a maximum width of 5 μm or more in plan view is 10 or less per a reference unit area of 0.25 mm² on a surface of the base film. Since the number of voids that may cause circuit defects is small, circuit defects in a fine pattern printed circuit can be suppressed.

(7) In the printed circuit according to an embodiment, one or both of the minimum conductor width and the minimum conductor spacing are 15 μm or less. Since the number of voids that may cause circuit defects is small, circuit defects in a fine pattern printed circuit can be suppressed.

(8) The base film has a through-hole penetrating in a thickness direction.

(9) A method of manufacturing a base material for a printed circuit according to an embodiment includes forming, on one surface of a base film containing polyimide as a main component, a first conductor layer which is a metal sintered layer, and forming, on the first conductor layer, a second conductor layer by electroless plating using a catalyst. The forming the second conductor layer includes depositing, on the first conductor layer, a conductor serving as the catalyst from an electroless plating solution by an electrolysis assist in which an electric potential is applied to the first conductor layer in the electroless plating solution.

Details of Embodiments of Present Disclosure

Hereinafter, embodiments of the present disclosure will be described in detail with reference to the drawings.

[Base Material for Printed Circuit]

A base material for printed circuit 200 shown in FIG. 1 includes a base film 1 having insulating properties and a conductor layer 2 laminated on at least one surface of base film 1. A printed circuit 300 is manufactured by forming a conductive pattern of a circuit in conductor layer 2 of base material for printed circuit 200. Printed circuit 300 is, for example, a flexible printed circuit (FPC).

[Base Film]

Base film 1 is a sheet-like member. Base film 1 supports the conductive pattern in printed circuit 300 formed using base material for printed circuit 200.

In the embodiment, the material of base film 1 is polyimide. Base film 1 may contain other components as long as the main component is polyimide. The term "main component" as used herein refers to a component having a content of 50 wt % or more. Alternatively, the "main component" refers to a component having the largest content among the contained components. Polyimide may be used because it has a strong bonding force with metal oxide or the like formed on the surface of conductor layer 2.

A thickness of base film 1 is set by printed circuit 300 using base material for printed circuit 200, and is not particularly limited, but for example, a lower limit of an average thickness of base film 1 may be 5 μm or 12 μm. On the other hand, an upper limit of the average thickness of base film 1 may be 2 mm or 1.6 mm. When the average thickness of base film 1 is less than 5 μm, the strength of base film 1 may be insufficient. On the other hand, when the average thickness of base film 1 exceeds the 2 mm, it may be difficult to thin printed circuit 300.

The surface of base film 1 on which conductor layer 2 is laminated may be subjected to a hydrophilization treatment. The hydrophilization treatment may be, for example, a plasma treatment in which plasma is irradiated to hydrophilize the surface, or an alkali treatment in which an alkali solution is used to hydrophilize the surface. By performing the hydrophilization treatment on base film 1, a surface tension of conductive ink with respect to base film 1 is reduced, and thus it is easy to uniformly apply the conductive ink to base film 1.

[Conductor Layer]

Conductor layer 2 includes at least a first conductor layer 4 and a second conductor layer 5. Conductor layer 2 may further include first conductor layer 4, second conductor layer 5, and a third conductor layer 6 formed on second conductor layer 5. First conductor layer 4 is a conductor fired layer formed by applying and firing conductive ink containing conductor particles such as metal particles. First conductor layer 4 is formed on base film 1. Second conductor layer 5 is an electroless plating layer formed by electroless plating on one surface (opposite to base film 1) of first conductor layer 4. Third conductor layer 6 is, for example, an electroplating layer formed by electroplating on one surface (opposite to base film 1) of second conductor layer 5.

A thickness of conductor layer 2 is determined by what kind of printed circuit 300 is formed using base material for printed circuit 200. A lower limit of an average thickness of conductor layer 2 is not particularly limited, but may be 1 μm or 2 μm. On the other hand, an upper limit of the average thickness of conductor layer 2 is not particularly limited, but may be 100 μm or 50 μm. When the average thickness of conductor layer 2 is less than 1 μm, conductor layer 2 may be easily damaged. On the other hand, if the average thickness of conductor layer 2 exceeds 100 μm, it may be difficult to make printed circuit 300 thinner.

[First Conductor Layer]

First conductor layer 4 is a metal sintered layer. The metal sintered layer is, for example, a sintered layer formed of metal particles. First conductor layer 4 is formed by, for example, applying and firing conductive ink containing metal particles. First conductor layer 4 is laminated on one surface of base film 1. In base material for printed circuit 200, since first conductor layer 4 is formed by applying and firing the conductive ink, one surface of base film 1 can be easily covered with a conductive film. Note that first conductor layer 4 is formed by firing after applying the conductive ink in order to remove unnecessary organic substances and the like in the conductive ink and reliably fix the metal particles to one surface of base film 1.

The conductive ink to form first conductor layer 4 contains metal particles as a conductive material providing conductivity. In the embodiment of the present disclosure, the conductive ink containing metal particles, a dispersant for dispersing the metal particles, and a dispersion medium is used as the conductive ink. By applying such conductive ink, first conductor layer 4 made of fine metal particles is laminated on one surface of base film 1.

The metal constituting the metal particles contained in the conductive ink is not particularly limited, but from the viewpoint of improving the adhesive force between first conductor layer 4 and base film 1, a metal oxide based on the metal or a group derived from the metal oxide and a metal hydroxide based on the metal or a group derived from the metal hydroxide may be generated, and for example, copper, nickel, aluminum, gold or silver may be used. Among them, copper may be used because it has good conductivity and excellent adhesion to base film 1.

An lower limit of an average particle diameter of the metal particles contained in the conductive ink may be 1 nm or 30 nm. On the other hand, an upper limit of the average particle diameter of the metal particles may be 500 nm or 100 nm. When the average particle diameter of the metal particles is less than the 1 nm, the metal particles may be less dispersible and stable in the conductive ink. On the other hand, when the average particle diameter of the metal particles exceeds the 500 nm, the metal particles may be easily precipitated, or the density of the metal particles may not be uniform when the conductive ink is applied.

A lower limit of an average thickness of first conductor layer 4 may be 0.05 μm or 0.1 μm. Meanwhile, an upper limit of the average thickness of first conductor layer 4 may be 2 μm or 1.5 μm. When the average thickness of first conductor layer 4 is less than 0.05 μm, there is a possibility that first conductor layer 4 may have breaks and the conductivity may be lowered. On the other hand, if the average thickness of first conductor layer 4 is more than 2 μm, it may be difficult to reduce the thickness of conductor layer 2, or pores of first conductor layer 4 may not be filled with a metal when second conductor layer 5 is formed as described later, resulting in insufficient conductivity and strength of first conductor layer 4 and conductor layer 2.

[Second Conductor Layer]

Second conductor layer 5 is laminated on the surface of first conductor layer 4, that is, the surface opposite to base film 1, by electroless plating. Since second conductor layer 5 is formed by electroless plating, gaps between the metal particles forming first conductor layer 4 are filled with the metal of second conductor layer 5. When the gap remains in first conductor layer 4, the gap portion becomes a fracture starting point and first conductor layer 4 is easily peeled off from base film 1. However, since the gap portion is filled with the metal constituting second conductor layer 5, the peeling off of first conductor layer 4 is suppressed.

As the metal used for the electroless plating, copper, nickel, silver or the like having good conductivity can be used, and when copper is used for the metal particles forming first conductor layer 4, copper or nickel may be used in consideration of adhesion to first conductor layer 4. When a metal other than nickel is used for electroless plating, the plating solution used for electroless plating may contain nickel or a nickel compound in addition to the plating metal.

An lower limit of an average thickness of second conductor layer 5 formed by electroless plating may be 0.2 μm or 0.3 µm. On the other hand, an upper limit of the average thickness of second conductor layer 5 formed by electroless plating may be 1 µm or 0.5 µm. If the average thickness of second conductor layer 5 formed by electroless plating is less than 0.2 µm, second conductor layer 5 may not be sufficiently filled in the gap portion of first conductor layer 4 and the conductivity may be lowered. On the other hand, when the average thickness of second conductor layer 5 formed by the electroless plating is more than 1 µm, the time required for the electroless plating may be increased and the productivity may be reduced.

[Third Conductor Layer]

For example, third conductor layer 6 is laminated and formed by electroplating on the surface of second conductor layer 5 formed by electroless plating. In this case, third conductor layer 6 is an electroplating layer formed by electroplating. Further, third conductor layer 6 may be a metal foil layer provided on the surface of second conductor layer 5. The metal foil layer may be an ultra-thin metal foil layer, such as an ultra-thin copper foil layer. A thickness of the metal foil layer is, for example, from 0.5 µm to 10 µm. Thus, by laminating third conductor layer 6 on the surface of second conductor layer 5, the thickness of conductor layer 2 can be easily and accurately adjusted, and a conductor layer having a thickness required for forming printed circuit 300 can be formed in a relatively short time.

As the metal used for the electroplating for forming third conductor layer 6, copper, nickel, silver or the like having good conductivity can be used. When third conductor layer 6 is an ultra-thin copper foil layer, third conductor layer 6 can be laminated by bonding by thermocompression bonding or the like.

A thickness of third conductor layer 6 is determined according to the required thickness of entire conductor layer 2.

[Method of Manufacturing Base Material for Printed Circuit]

Figure 2:
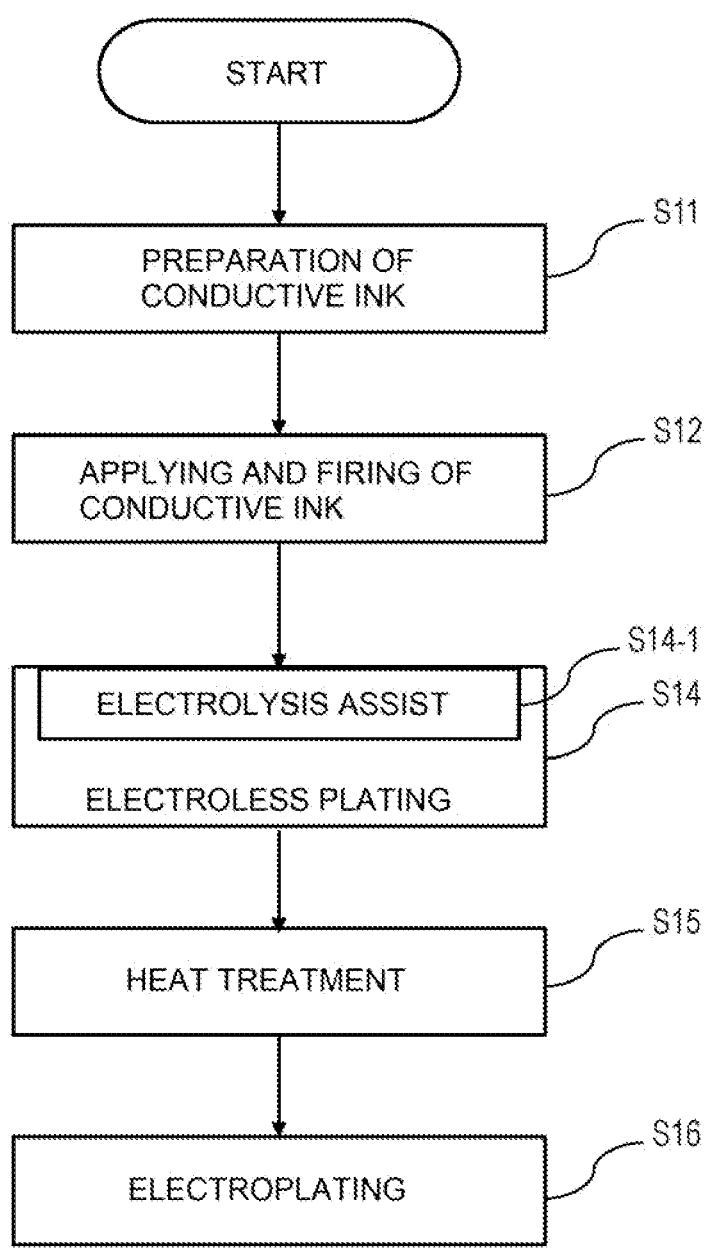
FIG. 2 is a flowchart showing a method of manufacturing a base material for a printed circuit according to an embodiment.

FIG. 2 shows a method of manufacturing the base material for printed circuit shown in FIG. 1.

In an embodiment, a method of manufacturing a base material for printed circuit includes a preparation of conductive ink step (Step S11), an applying and firing of conductive ink step (Step S12), an electroless plating step (Step S14), a heat treatment step (Step S15), and an electroplating step (Step S16).

[Preparation Step (Step S11)]

In preparation step of Step S11, conductive ink containing metal particles is prepared. In the preparation step, the dispersant is dissolved in the dispersion medium, and the above-described metal particles are dispersed in the dispersion medium. In other words, the dispersant surrounds the metal particles to suppress aggregation, thereby favorably dispersing the metal particles in the dispersion medium. The dispersant may be added to the reaction system in the form of a solution dissolved in water or a water-soluble organic solvent.

As the dispersion medium of the conductive ink, water, a highly polar solvent, or a mixture of two or three or more of water and highly polar solvents can be used, and among them, a mixture of water as a main component and a highly polar solvent compatible with water is preferably used.

It is preferable that the dispersant contained in the conductive ink does not contain sulfur, phosphorus, boron, halogen and alkali from the viewpoint of preventing deterioration of the base material for printed circuit. Examples of such dispersants include amine-based polymer dispersants such as polyethyleneimine and polyvinylpyrrolidone, hydrocarbon-based polymer dispersants, polymer dispersants each having a carboxylic acid group in the molecule such as polyacrylic acid and carboxymethyl cellulose, and polymer dispersants each having a polar group such as poval (polyvinyl alcohol), styrene-maleic acid copolymers, olefin-maleic acid copolymers, and copolymers each having a polyethyleneimine moiety and a polyethylene oxide moiety in one molecule.

[Applying and Firing Step (Step S12)]

In applying and firing step of Step S12, first conductor layer 4 is formed by applying and firing the conductive ink on one surface of base film 1 having an insulating property. In the applying and firing step, the conductive ink prepared in Step S11 is applied on the surface of base film 1, dried, and then heated and fired. The surface of base film 1 to which the conductive ink is applied is previously subjected to a hydrophilization treatment such as the above-described alkali treatment, and is thus modified.

As a method of applying the conductive ink in which the metal particles are dispersed on one surface of base film 1, a conventionally known application method such as a spin coating method, a spray coating method, a bar coating method, a die coating method, a slit coating method, a roll coating method, or a dip coating method can be used. Alternatively, the conductive ink may be applied to only a part of one surface of base film 1 by screen printing, a dispenser, or the like.

Subsequently, the dispersion medium in the conductive ink applied to base film 1 is evaporated to dry the conductive ink.

As a method for drying the conductive ink, natural drying, drying by heating, drying by hot air, or the like can be applied. However, the method should be such that the conductive ink before drying is not exposed to strong winds that may damage the surface of the conductive ink.

Further, by heating the dried conductive ink, the dispersion medium in the conductive ink is thermally decomposed and the metal particles are fired to form first conductor layer 4. As a result of the firing, the metal particles are brought into a sintered state or a state in which the metal particles are in close contact with each other and are solid-bonded to each other in a pre-stage before sintering. Therefore, first conductor layer 4 after the applying and firing step of conductive ink may have pores corresponding to gaps between the metal particles.

The firing is performed in an atmosphere containing a certain amount of oxygen. A lower limit of the oxygen concentration in the atmosphere during firing is 1 ppm by volume, and may be 10 ppm by volume. An upper limit of the oxygen concentration is 10,000 ppm by volume, and may be 1,000 ppm by volume. When the oxygen concentration is less than 1 ppm by volume, the amount of metal oxide generated in the vicinity of the interface of first conductor layer 4 is reduced, and the effect of improving the adhesive force between first conductor layer 4 and base film 1 by the metal oxide may not be sufficiently obtained. On the other hand, when the oxygen concentration exceeds 10,000 ppm by volume, the metal particles may be excessively oxidized and the conductivity of first conductor layer 4 may be reduced.

A lower limit of the firing temperature may be 150° C. or 200° C. An upper limit of the firing temperature may be 500° C. or 400° C. If the firing temperature is lower than 150° C., the amount of metal oxide generated in the vicinity of the interface of first conductor layer 4 is reduced, and the effect of improving the adhesive force between first conductor layer 4 and base film 1 by the metal oxide may not be sufficiently obtained. On the other hand, if the firing temperature exceeds 500° C., base film 1 may be deformed when base film 1 is made of an organic resin such as polyimide.

[Electroless Plating Step (Step S14)]

In electroless plating step of Step S14, second conductor layer 5 is formed by depositing metal on the surface of first conductor layer 4 and in the pores inside first conductor layer 4 by performing electroless plating using an electroless plating solution. Before electroless plating step of Step S14, base film 1 on the surface of which first conductor layer 4 is formed may be subjected to degreasing cleaning and pickling treatment.

The electroless plating solution deposits metal. Examples of the metal to be deposited include copper, nickel, and silver, as described above. For example, when copper is deposited, a copper plating solution containing a trace amount of nickel is used as a copper plating solution used in electroless plating. By using a copper plating solution containing nickel or a nickel compound, second conductor layer 5 having low stress can be formed. The copper plating solution may contain, for example, from 0.1 mol to 60 mol of nickel with respect to 100 mol of copper. In addition, other components such as a complexing agent, a reducing agent, and a pH adjuster may be appropriately added to the copper plating solution.

Electroless plating step of Step S14 includes a step of depositing a metal (conductor) serving as a catalyst from the electroless plating solution on first conductor layer 4 by electrolysis assist (Step S14-1). In electroless plating step of Step S14, a metal (conductor) is deposited on the surface and inside of first conductor layer 4 by electroless plating using the metal (conductor) deposited by electrolysis assist of Step S14-1 as a catalyst. Although a pretreatment for attaching a catalyst such as palladium is required in a general electroless plating step, a pretreatment for attaching a catalyst such as palladium is not required in electroless plating step of Step S14 because the metal deposited from the electroless plating is used as a catalyst. Examples of a catalyst that may be used in a general electroless plating step include platinum (Pt), nickel (Ni), cobalt (Co), iron (Fe), chromium (Cr), silver (Ag), and gold (Au), in addition to palladium. In base material for printed circuit 200 manufactured by the method of manufacturing a base material for printed circuit of the present disclosure, at least one of palladium (Pd), platinum (Pt), nickel (Ni), cobalt (Co), iron (Fe), chromium (Cr), silver (Ag), and gold (Au) is not contained at all or is not substantially contained in base film 1.

The electrolysis assist is a method in which a potential is applied to an object to be treated (object to be plated) with an electroless plating solution during initial deposition of the electroless plating. By performing the electrolysis assist, a metal is deposited on first conductor layer 4 from the electroless plating solution by utilizing electric energy as in electroplating while using the electroless plating solution. That is, in the electrolysis assist, plating is auxiliarily performed by electrification using an electroless plating solution. In the method of manufacturing according to the embodiment, before electroless plating step of Step S14, first conductor layer 4 is formed on a surface of a base film 110, which is a product to be treated with the electroless plating solution, and base film 110 has conductivity. In the electrolysis assist, a metal is deposited on first conductor layer 4 from the electroless plating solution by electric energy by utilizing the fact that the product to be treated by the electroless plating can be electrified with first conductor layer 4.

Figure 3:
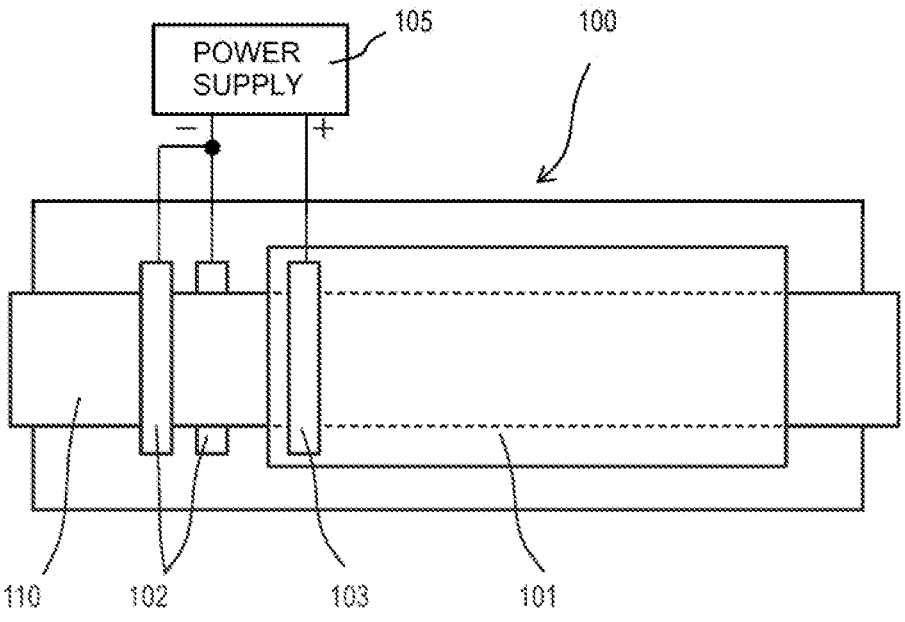
FIG. 3 is a schematic plan view showing an electroless plating apparatus.

FIG. 3 shows an example of an electroless plating apparatus 100 capable of performing electroless plating step (Step S14) including an electrolysis assist step (Step S14-1). Electroless plating apparatus 100 includes an electroless plating treatment tank 101 containing an electroless plating solution. Electroless plating apparatus 100 includes a roller 102 that conveys base film 110 on which first conductor layer 4 is formed to electroless plating treatment tank 101. Base film 110 on which first conductor layer 4 is formed is conveyed into electroless plating treatment tank 101 by roller 102 and is immersed in the electroless plating solution.

Roller 102 is made of a conductive material such as SUS. Roller 102 is connected to the negative electrode of a direct current (DC) power supply 105 and applies a negative potential to base film 110 on which first conductor layer 4 is formed. Thus, roller 102 serves as a first electrode for applying a negative potential to first conductor layer 4 outside electroless plating treatment tank 101. In electroless plating treatment tank 101, a Ti plate serving as a counter electrode 103 (second electrode) is provided. Counter electrode 103 is connected to the positive electrode of DC power supply 105 to apply a positive potential to the electroless plating solution.

When a negative potential is applied to first conductor layer 4 from roller 102 serving as the first electrode, the potential of first conductor layer 4 immersed in the electroless plating solution decreases. As a result, metal such as copper is deposited from the electroless plating solution on first conductor layer 4 immersed in the electroless plating solution. The metal deposited by the electrolysis assist serves as a catalyst for electroless plating. As described above, the electrolysis assist step may be a step of attaching a catalyst for electroless plating to first conductor layer 4.

In electroless plating treatment tank 101, electroless plating is performed using the metal deposited by the electrolysis assist as a catalyst. This electroless plating forms second conductor layer 5 by depositing metal on the surface of first conductor layer 4, and at the same time, first conductor layer 4 is densified by depositing metal in the pores inside first conductor layer 4, The densification of first conductor layer 4 not only improves the conductivity of first conductor layer 4 but also increases the adhesion area of first conductor layer 4 to base film 1, thereby increasing the peeling strength of first conductor layer 4 and conductor layer 2 from the base film 1.

In electroless plating step of Step S14, when base film 110 on which first conductor layer 4 is formed is immersed in the electroless plating solution, plating is instantaneously formed on the surface of first conductor layer 4 by the electrolysis assist, and then electroless plating is formed by the electroless plating solution. This prevents the electroless plating solution from penetrating into base film 1. As a result, damage given to base film 1 by the electroless plating solution can be suppressed. By suppressing damage to base film 1, thermal decomposition of base film 1 is suppressed. As described above, since plating by electrolysis assist is formed on base film 1, even if electroless plating is performed on base film 1, damage due to the electroless plating is suppressed, and base film 1 in which thermal decomposition is suppressed is obtained.

After electroless plating step of Step S14, a post-pickling treatment may be performed.

[Heat Treatment Step (Step S15)]

Referring back to FIG. 2, after the electroless plating step, heat treatment step of Step S15 is performed. The lower limit of the treatment temperature in the heat treatment step may be 150° C. or 200° C. On the other hand, the upper limit of the treatment temperature in the heat treatment step may be 500° C. or 400° C. The lower limit of the heat treatment time in the heat treatment step may be 15 minutes or 30 minutes. On the other hand, the upper limit of the heat treatment time in the heat treatment step may be 720 minutes or 360 minutes.

[Electroplating Step (Step S16)]

In electroplating step of Step S16, third conductor layer 6 is formed by further laminating a metal by electroplating on the surface of second conductor layer 5 formed in electroless plating step of Step S14. At this time, the pores remaining in first conductor layer 4 are filled with a metal by electroplating to further density first conductor layer 4, thereby further increasing the peeling strength of first conductor layer 4 from base film 1. By this electroplating step, conductor layer 2 can be easily and reliably grown to a desired thickness.

As a specific method of electroplating in this electroplating step, a known electroplating method can be applied. Instead of electroplating step (Step S16), thermocompression bonding of the ultra-thin copper foil may be performed. In this case, an ultra-thin copper foil layer is formed as third conductor layer 6.

[Printed Circuit]

Printed circuit 300 is manufactured by performing a circuit pattern forming processing for forming a conductive pattern on base material for printed circuit 200 shown in FIG. 1.

Figure 4:
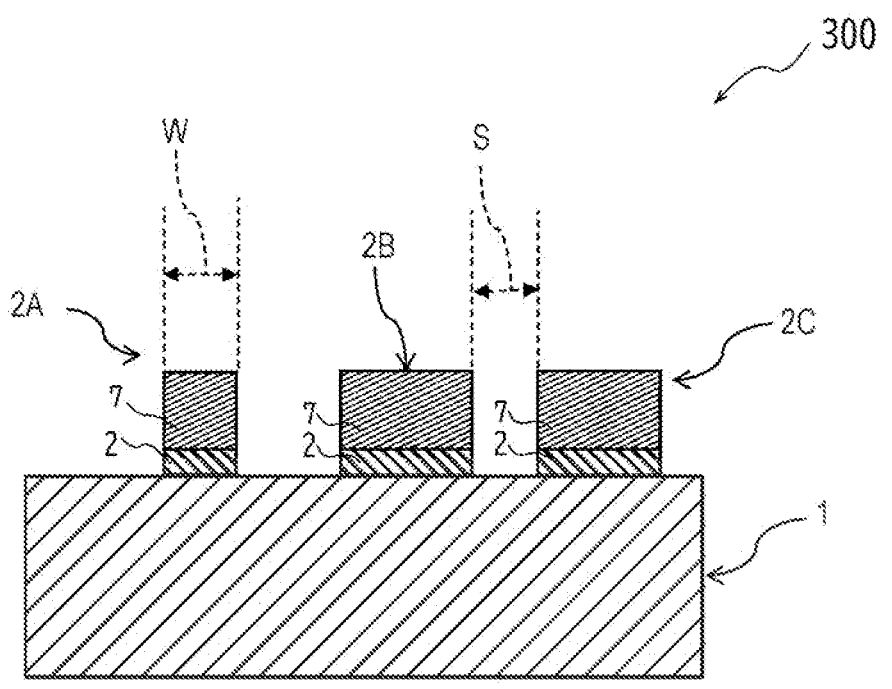
FIG. 4 is a schematic cross-sectional view of a printed circuit.

FIG. 4 shows printed circuit 300. Conductive patterns 2A, 2B, and 2C are formed on base film 1. Conductive patterns 2A, 2B, and 2C in printed circuit 300 according to the embodiment are fine patterns and have a very small minimum conductor width W and a very small minimum conductor spacing S. Here, minimum conductor width W refers to the minimum one of the conductor widths included in conductive patterns 2A, 2B, and 2C. Also, the minimum conductor spacing refers to the minimum spacing between conductors formed by conductive patterns 2A, 2B, and 2C.

Minimum conductor width W may be 20 µm or less, may be 15 µm or less, or may be 10 µm or less. Further, minimum conductor spacing S may be 20 µm or less, 15 µm or less, or 10 µm or less. It is sufficient that either one of the minimum conductor width and the minimum conductor spacing has the above-described numerical value, but both the minimum conductor width and the minimum conductor spacing may have the above-described numerical values.

Figure 5:
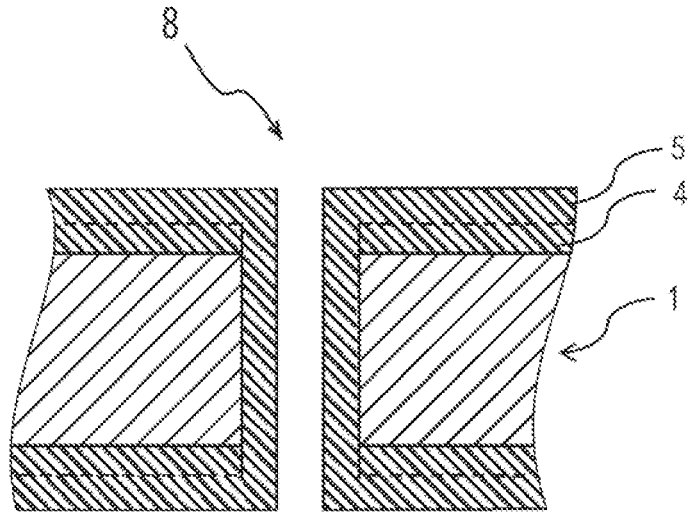
FIG. 5 is a schematic cross-sectional view showing an inner wall and a periphery of a through-hole included in a base film.

Each of conductive patterns 2A, 2B, and 2C include conductor layer 2 on base film 1. Conductor layer 2 includes first conductor layer 4 and second conductor layer 5 on first conductor layer. Third conductor layer 6 may be further included on second conductor layer 5. Each of conductive patterns 2A, 2B, and 2C may further include one or more fourth conductor layers 7 on conductor layer 2. Base film 1 may include a through-hole penetrating in a thickness direction. FIG. 5 is a schematic cross-sectional view showing an inner wall and a periphery of a through-hole when the through-hole is included.

[Method of Manufacturing Printed Circuit]

The circuit pattern forming processing is, for example, a subtractive method or a semi-additive method.

In the subtractive method, a photosensitive resist is formed to cover one surface of base material for printed circuit 200, and patterning corresponding to the conductive pattern is performed on the resist by exposure, development, and the like. Subsequently, portions of conductor layer 2 other than the conductive pattern are removed by etching using the patterned resist as a mask. Finally, the remaining resist is removed to obtain printed circuit 300 having a conductive pattern formed from the remaining portion of conductor layer 2 of base material for printed circuit 200 of FIG. 1.

In the semi-additive method, a photosensitive resist is formed to cover one surface of base material for printed circuit 200, and an opening corresponding to the conductive pattern is patterned in the resist by exposure, development, or the like. Subsequently, by performing plating using the patterned resist as a mask, a conductor layer is selectively laminated on conductor layer 2 exposed in the opening of the mask. Thereafter, the resist is peeled off and the surface of the conductor layer described above and conductor layer 2 on which the conductor layer is not formed are removed by etching, thereby obtaining the printed circuit having a conductive pattern formed by laminating another conductor layer on the remaining portion of conductor layer 2 of base material for printed circuit 200 of FIG. 1.

Base film 1 in base material for printed circuit 200 manufactured by the method of manufacturing of FIG. 2 does not contain palladium. This is because the method of manufacturing of FIG. 2 does not include the step of depositing palladium as a catalyst for electroless plating in Step S14. "The base film does not contain palladium" means that the base film does not contain palladium at all, or the base film does not substantially contain palladium. "The base film does not substantially contain palladium" means that palladium is not contained in the base film except for a content in which palladium is inevitably contained. The content inevitably contained is, for example, a content of from 0.05 ppm to 10 ppm obtained as a result of cutting out polyimide on the base film on the conductor layer side and performing ICP analysis.

Since base film 1 does not contain palladium, generation of voids (see FIGS. 8 to 10) in base film 1 can be suppressed. The generation of voids will be described in detail in the description of a method of manufacturing a base material for a printed circuit according to a reference example described later.

In base film 1 of base material for printed circuit 200 manufactured by the method of manufacturing shown in FIG. 2, the number of voids generated in base film 1 is 10 or less per a reference unit area D of 0.25 mm$^2$ on the surface of the base film. The number of voids per reference unit area D may be 5 or less, or may be 1 or less. Preferably, the number of voids is 0.

The void may have a void maximum width L (see FIGS. 8 and 9) of from 5 µm to 10 µm in a plan view of the base film. Voids having maximum width L of from 5 µm to 10 µm are likely to cause circuit defects in the fine pattern as described above, but when the number of voids is 10 or less per reference unit area D, the probability of occurrence of a circuit defect can be sufficiently suppressed.

Maximum width L of the void may be ¼ times or more of minimum conductor width W, or may be ¼ times or more of minimum conductor spacing S. In addition, maximum width L of the void may be ½ times or more of minimum conductor width W, and may be ½ times or more of minimum conductor spacing S. When maximum width L of the void is large to this extent, a circuit defect is likely to occur in the fine pattern, but when the number of the voids is 10 or less per reference unit area D, the probability of occurrence of a circuit defect can be sufficiently suppressed.

An area of the void may be from 20 µm$^2$ to 100 µm$^2$. When the area of void is as large as this, circuit defects are likely to occur in the fine pattern, but when the number of the voids is 10 or less per reference unit area D, the probability of occurrence of a circuit defect can be sufficiently suppressed.

Figure 8:
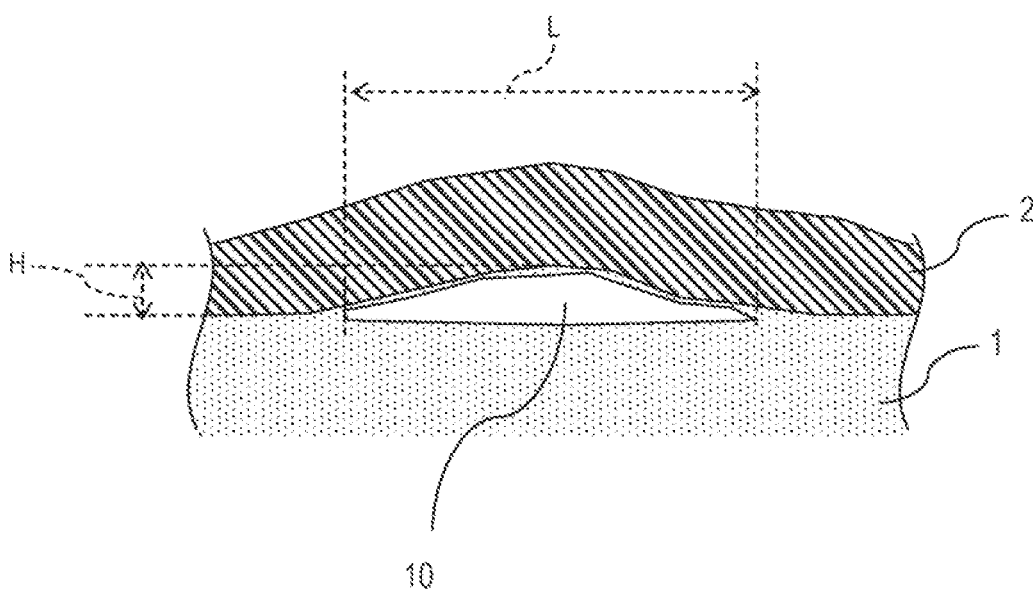
FIG. 8 is an enlarged cross-sectional view of a void occurrence location in a base material for a printed circuit according to a reference example.
Figure 9:
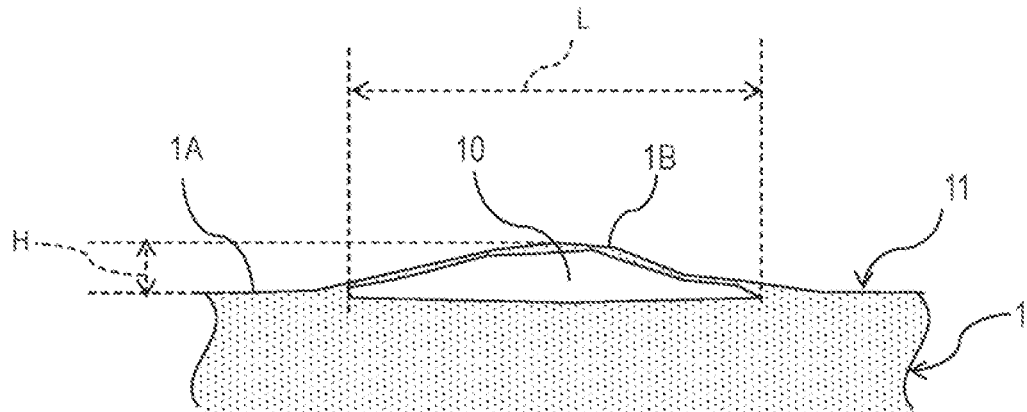
FIG. 9 is an enlarged cross-sectional view of the base film after removing the conductor layer from the circuit base material shown in FIG. 8 by etching.

The void may have a height H (see FIGS. 8 and 9) of from 1.5 μm to 5 μm. Voids having large height H are likely to cause circuit defects. As shown in FIG. 9, height H is defined as the height of a surface of the base film in a portion 1B where void is present relative to a surface of the base film in a portion 1A where no void is present in the base film. FIG. 9 shows a cross section of the base film after conductor layer 2 is removed from base material for printed circuit 200 of FIG. 8 by etching. As portion 1A where no void is present in the base film, a portion having the lowest height on the surface of the base film may be selected. Height H can be obtained by scanning the surface of the base film with a laser microscope.

[Method of Manufacturing Base Material for Printed Circuit According to Reference Example]

Figure 6:
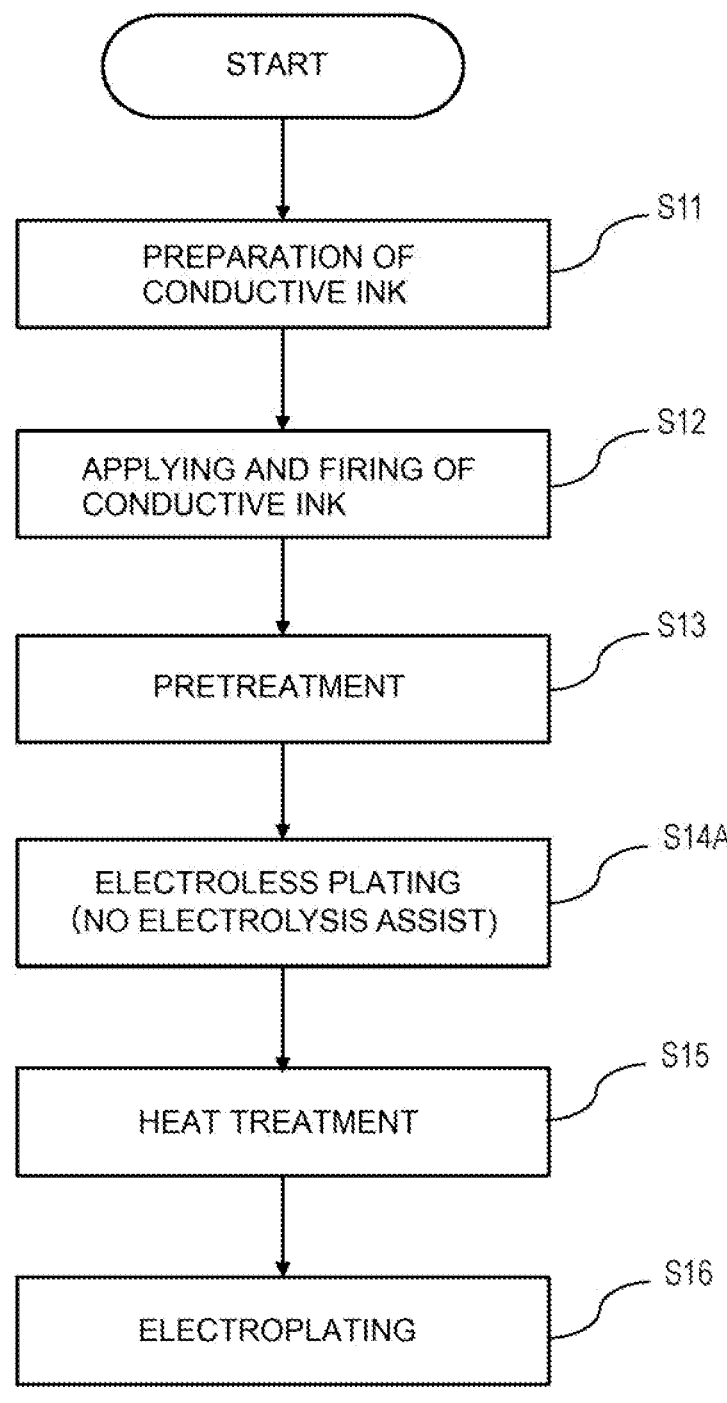
FIG. 6 is a flowchart showing a method of manufacturing a base material for a printed circuit according to a reference example.

FIG. 6 shows a procedure of a method of manufacturing a base material for printed circuit according to a reference example. The method of manufacturing shown in FIG. 6 is different from the method of manufacturing shown in FIG. 2 in that a pretreatment step (Step S13) is performed before the electroless plating step and that the electrolysis assist is not performed in the electroless plating step. In the method of manufacturing shown in FIG. 6, preparation of conductive ink step (Step S11), applying and firing of conductive ink step (Step S12), and electroplating step (Step S16) are similar to those in the method of manufacturing shown in FIG. 2. Pretreatment step (Step S13), an electroless plating step (Step S14A), and heat treatment step (Step S15) shown in FIG. 6 will be described below.

[Pretreatment Step (Step S13)]

In pretreatment step of Step S13, palladium, for example, serving as a catalyst in electroless plating is adsorbed on first conductor layer 4. In the pretreatment step, first conductor layer 4 is brought into contact with a catalyst solution containing palladium to adsorb palladium ions, and the palladium ions are reduced to metallic palladium. The palladium concentration of the catalyst solution may be, for example, from 20 ppm by mass to 1000 ppm by mass.

A lower limit of the temperature of the catalyst solution during immersion may be 30° C. or 40° C., depending on the immersion time. On the other hand, an upper limit of the temperature of the catalyst solution during the immersion may be 70° C. or 60° C.

A lower limit of the immersion time in the catalyst solution may be 1 minute, 2 minutes, or 3 minutes, depending on the temperature of the catalyst solution. On the other hand, an upper limit of the immersion time in the catalyst solution may be 10 minutes, 7 minutes, or 5 minutes.

[Electroless Plating Step (Step S14A: No Electrolysis Assist)]

In electroless plating step of Step S14A, a metal is deposited on the surface and inside of first conductor layer 4 using the palladium adsorbed on first conductor layer 4 in pretreatment step of Step S13 as a catalyst. In the method of manufacturing according to the reference example, since palladium is used as the catalyst, the electrolysis assist is not performed.

In electroless plating step of Step S14A, second conductor layer 5 is formed by depositing metal on the surface of first conductor layer 4 and in the pores inside first conductor layer 4 by performing electroless plating using an electroless plating solution. Before electroless plating step of Step S14A, base film 1 on the surface of which first conductor layer 4 is formed may be subjected to degreasing cleaning and pickling treatment.

Palladium penetrates into base film 1 during electroless plating. Further, the electroless plating solution penetrates into base film 1 through first conductor layer 4.

[Heat Treatment Step (Step S15)]

Heat treatment step of Step S15 shown in FIG. 6 is performed in the similar manner to the heat treatment step shown in FIG. 2. However, the heat treatment promotes the penetration of palladium present in the vicinity of the interface between conductor layer 2 and base film 1 into base film 1.

Figure 7:
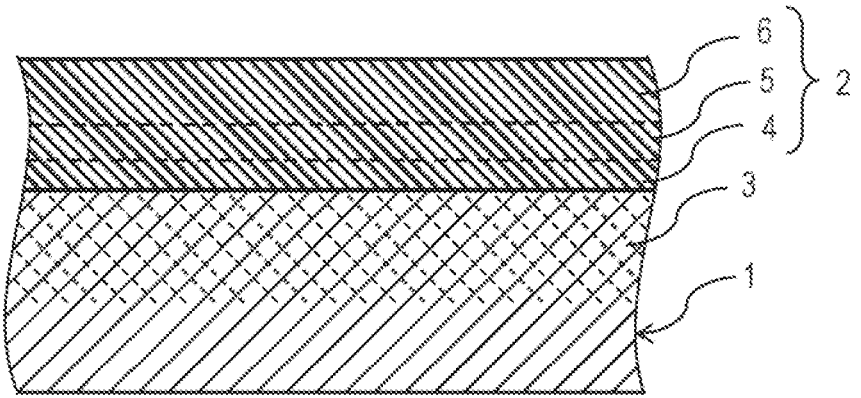
FIG. 7 is a schematic cross-sectional view of a base material for a printed circuit according to a reference example.

FIG. 7 shows a base material for printed circuit in which palladium is dispersed inside base film 1. Base film 1 shown in FIG. 7 has a dispersed portion 3 in which palladium is dispersed. In the case of the method of manufacturing of the reference example shown in FIG. 6, in dispersed portion 3, the palladium content in base film 1 measured by ICP mass spectrometry is 290 ppm or more.

Figure 10:
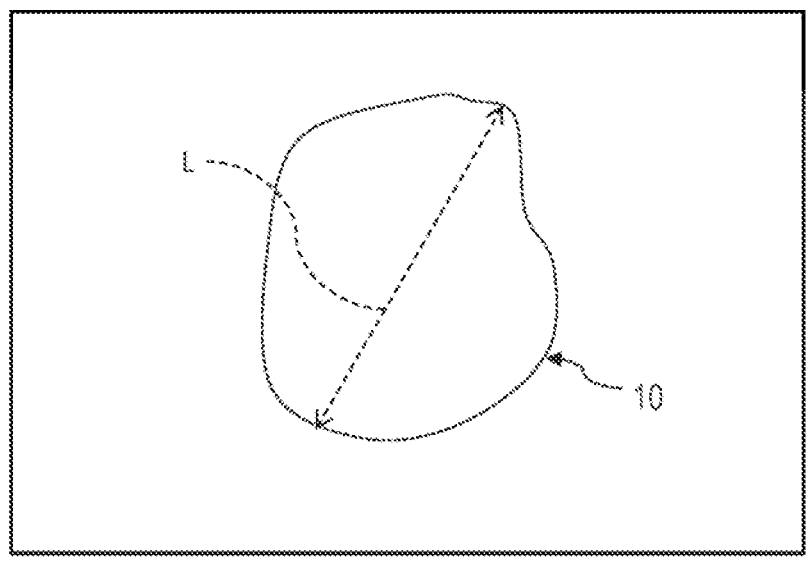
FIG. 10 is an enlarged image (schematic view) of a void occurrence location on the surface of the base film.

Dispersed portion 3 is formed by introducing and dispersing palladium into base film 1 from the surface of base film 1. Dispersed portion 3 is formed in a layer shape having a substantially constant thickness so that palladium is substantially uniformly introduced and dispersed from the interface between base film 1 and conductor layer 2 and occupies a part or all of base film 1 in the thickness direction with the interface between base film 1 and conductor layer 2 as a base end. That is, dispersed portion 3 may include a region from an interface between base film 1 and conductor layer 2 to a predetermined depth, When the base material for printed circuit is manufactured by the method of manufacturing according to the reference example, a void 10 is generated in base film 1 as shown in FIGS. 8 to 10. Void 10 is a void generated inside base film 1. Void 10 is formed in the vicinity of a interface 11 between base film 1 and conductor layer 2 and locally expands the surface of base film 1 toward conductor layer 2. Voids 10 are generated in a scattered manner on the surface of base film 1. Void 10 has an irregular shape, but is generally formed in a dot shape.

The present inventors have found that the cause of the occurrence of voids 10 is palladium that has penetrated into base film 1 containing polyimide as a main component. The palladium catalyst penetrates into base film 1 during electroless plating. When the palladium penetrates into base film 1 and causes a reduction reaction by the catalytic action of the palladium, a gas is generated in base film 1. By the generation of the gas, voids 10 are generated in base film 1.

FIG. 8 is an enlarged cross-sectional view of a void occurrence location in a base material for printed circuit according to a reference example. In the reference example, void 10 has maximum width L of approximately 1 μm to 10 μm in the base film plan view. Void 10 has height H of about 0.1 μm to 5 μm. A number of voids 10 are observed in the base film of the base material for printed circuit according to the reference example. On the other hand, in base film 1 of the base material for printed circuit of the present disclosure, void 10 having maximum width L of 5 μm or more is suppressed in the plan view. Here, maximum widths L of void 10 according to the reference example and of the void suppressed in the base material for printed circuit of the present disclosure are measured by, for example, removing conductor layer 2 of the manufactured base material for printed circuit by etching and observing the surface of base film 1 with a fluorescence microscope. Height H of void 10 is measured, for example, by observing the surface of base film 1 from which conductor layer 2 has been removed with a laser microscope.

Void 10 is relatively small. For this reason, when the conductor width or the conductor spacing is sufficiently larger than the void in a normal printed circuit, the presence of void 10 hardly causes a problem. However, when the printed circuit has a fine pattern, since a conductor width or a conductor spacing is fine, a circuit defect may occur due to the presence of void 10. For example, if a conductive pattern having a conductor width substantially equal to or smaller than the size of void 10 is present immediately above void 10 shown in FIGS. 8 to 10, there is a possibility that a conduction failure of the conductive pattern occurs. Such a circuit defect is more likely to occur as maximum width L of void 10 is larger, and more likely to occur as height H of void 10 is larger.

As described above, when the base material for the fine pattern printed circuit is manufactured by the method of manufacturing according to the reference example shown in FIG. 6, void 10 may be generated in base film 1 and there is a possibility that a circuit defect is generated in the fine pattern printed circuit. On the other hand, when the base material for the fine pattern printed circuit is manufactured by the method of manufacturing shown in FIG. 2, the generation of void 10 can be suppressed. In the method of manufacturing shown in FIG. 2, a catalyst generated by electrolysis assist is used in the electroless plating step without using a metal catalyst such as palladium. Since palladium which causes generation of void 10 is not present, generation of void 10 in base film 1 is suppressed. When the fine pattern printed circuit is manufactured from a base material for printed circuit in which voids 10 are hardly present, the occurrence of circuit defects can be suppressed.

EXAMPLES

The results of trial manufacture of a base material for printed circuit will be described below.

[First, Second and Third Prototypes (With Electrolysis Assist: Copper Catalyst)]

First, second, and third prototypes of the base materials for printed circuit were manufactured according to Steps S11, S12, and S14 shown in FIG. 2, Specifically, they were manufactured in the following manner. First, copper particles having an average particle diameter of 60 nm were dispersed in an aqueous medium to prepare a conductive ink having a copper concentration of 26 mass %. In addition, both surfaces of a polyimide film (Kapton "EN-S" manufactured by DuPont-Toray Co., Ltd.) having an average thickness of 25 μm as a base film having an insulating property were modified by an alkali treatment. The conductive ink was applied to both of the modified surfaces of the polyimide film, dried in the air, and then heated at 350° C. for 2 hours in a nitrogen atmosphere having an oxygen concentration of 100 ppm by volume to fire the copper particles in the conductive ink, thereby forming a first conductor layer as a sintered layer having an average thickness of 0.15 μm.

Next, electroless plating (Step S14) including electrolysis assist (Step S14-1) was performed using electroless plating apparatus 100 shown in FIG. 3. In the manufacture of the first, second, and third prototypes, palladium was not used as a catalyst for electroless plating, but copper deposited from an electroless copper plating solution by electrolysis assist was used. The electroless copper plating solution used contained 0.1 mol of nickel with respect to 100 mol of copper. A second conductor layer having an average thickness of 0.4 μm was formed on each of the first conductor layers on both surfaces of the base film by electroless plating. The formation of a third conductor layer was omitted, and a base material for printed circuit in which the first conductor layer and the second conductor layer were formed on the base film was obtained. The first, second, and third prototypes were all manufactured by the above-described method of manufacturing, but were manufactured by different manufacturing lines (plating solution tanks).

[Fourth Prototype (No Electrolysis Assist: Palladium Catalyst)]

A fourth prototype of the base material for printed circuit was manufactured according to Steps S11, S12, S13, and S14A shown in FIG. 6. The fourth prototype was manufactured in the similar manner to the first, second, and third prototypes until the first conductor layer, which is a sintered layer formed of metal particles, was manufactured.

In the manufacture of the fourth prototype, after the formation of the first conductor layer, palladium was adsorbed on the first conductor layer as pretreatment (Step S13). The first conductor layer was immersed in a catalyst solution containing 50 ppm by mass of palladium at a liquid temperature of 40° C. for 120 seconds to adsorb palladium on the first conductor layer.

In the manufacture of the fourth prototype, electroless plating apparatus 100 shown in FIG. 3 was used to perform electroless plating using palladium as a catalyst (Step S14A) without performing electrolysis assist (Step S14-1). The electroless copper plating solution used was the same as that used in the manufacture of the first, second, and third prototypes. A second conductor layer having an average thickness of 0.4 μm was formed on each of the first conductor layers on both surfaces of the base film by electroless plating. The formation of a third conductor layer was omitted, and the fourth prototype of the base material for printed circuit in which the first conductor layer and the second conductor layer were formed on the base film was obtained.

[Fifth Prototype]

A fifth prototype of the base material for printed circuit is obtained by omitting the first conductor layer from the fourth prototype. In other respects, the fifth prototype is similar to the fourth prototype. That is, the fifth prototype includes a base film and a second conductor layer formed directly on the base film. The fifth prototype was manufactured by omitting conductive ink preparation step (Step S11) and applying and firing of conductive ink step (Step S12) in the manufacturing step of the fourth prototype from the manufacturing step of the fourth prototype. To form the second conductor layer, electroless plating apparatus 100 shown in FIG. 3 was used to perform electroless plating using palladium as a catalyst (Step S14A). However, in the manufacture of the fifth prototype, electrolysis assist (Step S14-1) was not performed.

[Sixth Prototype]

In a sixth prototype of the base material for printed circuit, the first conductor layer in the first, second and third prototypes is formed by a vacuum deposited layer instead of the sintered layer formed of metal particles. The vacuum vapor deposition was carried out using a high vacuum vapor deposition apparatus RD-1400 manufactured by SANVAC Co., Ltd. at a vacuum degree of $5 \times 10^{-4}$ Pa or less using pure copper of 4N. The vacuum deposited layer was 100 nm thick. In other respects, the sixth prototype is similar to the first, second, and third prototypes. That is, the sixth prototype includes a base film, a first conductor layer which is a vacuum deposition layer formed on the base film, and a second conductor layer formed by electroless plating step (Step S14) including electrolysis assist step (Step S14-1).

[Measurement of Palladium Content]

each prototype, the palladium content was measured by ICP mass spectrometry. As an ICPMS analyzer, ICPMS7700X manufactured by Agilent Technologies was used. As the pretreatment, the polyimide exposed portion (interface with conductor layer 2) of the base film was cut off, and the cut polyimide was completely decomposed by microwaves in a concentrated sulfuric of 8 mL. Ultrapure water was added to the solution after total decomposition, and the volume was adjusted to 50 mL.

[Measurement of Carbon Dioxide Generation Amount]

In order to evaluate that thermal decomposition is suppressed in the first prototype using electrolysis assist, the amounts of carbon dioxide released from the first prototype and the fourth prototype in a high temperature state were measured. The size of the first prototype used for the measurement was 20×20 mm (8 $cm^2$ by both surfaces).

A thermogravity-mass spectrometer (TG-MS) was used for the measurement. As the thermogravity-mass spectrometer, 1449 ES Jupiter manufactured by NETZSCH and JMS-Q1500GC manufactured by JEOL were used. Helium was used as the measurement atmosphere gas. As a method of ionizing the generated gas components, an electron ionization method was used. The temperature was raised from room temperature (R.T.) to 100° C. at a rate of 10° C./min, then raised to 350° C. at a rate of 5° C./min, and held at 350° C. for 90 minutes. The amount of carbon dioxide generated from each of the first prototype and the fourth prototype when they were held at 350° C. for 90 minutes was measured. The amount of generated carbon dioxide was calculated by introducing a known amount of carbon dioxide into the thermogravity-mass spectrometer and preparing a calibration curve from the detected intensity. Then, the detected intensity at the time of measurement of each of the first prototype and the fourth prototype was converted into the carbon dioxide generation amount using the calibration curve.

In the first prototype, the amount of carbon dioxide generated when the first prototype was left at 350° C. for 90 minutes was 0.5 $\mu g/cm^2$. In addition, in the fourth prototype, the carbon dioxide generation amount when the fourth prototype was left at 350° C. for 90 minutes was 8.3 $\mu g/cm^2$. As described above, in the first prototype, the carbon dioxide generation amount when the sample is left at 350° C. for 90 minutes can be 1 $\mu g/cm^2$ or less, and it is understood that damage due to electroless plating is suppressed and thermal decomposition is suppressed.

[Observation Result of Prototype]

The conductor layer of each of the first to sixth prototypes was etched to expose the surface of the base film. Etching was carried out by immersion in an etching solution containing iron chloride (specific weight: 1.33 $g/cm^3$, concentration of free hydrochloric acid: 0.2 mol/L, temperature: 45° C.) for 2 minutes. After the immersion, water washing and drying were performed. The surface of the base film exposed by etching and removal was observed. The surfaces of the base films were observed using a metallurgical microscope BX51 manufactured by Olympus Corporation, and were imaged in a bright field.

In the metallurgical microscope image, the number N of voids per reference unit area of 0.25 $mm^2$ as visually measured. Voids having a maximum width of less than 5 μm were not subjected to measurement. That is, in the measured void, void maximum width L was 5 μm or more and height H was 1.5 μm or more in the metallurgical microscope image obtained by plan view of the base film.

Maximum width L of void was obtained by subjecting the metallurgical microscope image to image processing for extracting a void region and measuring the maximum width of the extracted void region. The area of void was obtained by counting the number of pixels in the extracted void region. Height H was obtained by scanning the surface of the base film with a laser microscope.

The number of voids per reference unit area D was obtained by converting the total number T of voids present in the metallurgical microscope image into the number N of voids per reference unit area D. Specifically, the number N of voids per reference unit area D was determined by calculation of T/(X/D) because a region having a width X corresponding to 0.02 $mm^2$ of the surface of the base film appears in the metallurgical microscope image.

Voids having a maximum width of 5 μm or more were not observed on the surface of the base film of the first prototype. That is, in the first prototype, the number N of voids per reference unit area D was 0.

In the second prototype, the number N of voids per reference unit area D was 3. Maximum width L of the largest void among the voids confirmed in the second prototype was 6 μm, and height H was 3 μm.

In the third prototype, the number N of voids per reference unit area D was 9. Maximum width L of the largest void among the voids confirmed in the third prototype was 8 μm, and height H was 4 μm.

Voids were present in a scattered manner on the surface of the base film of the fourth prototype. In the fourth prototype, the number N of voids per reference unit area D was 76. Maximum width L of the largest void among the voids confirmed in the fourth prototype was 8 μm, and height H was 2 μm.

In the fifth prototype, the number N of voids per reference unit area D was 135. Maximum width L of the largest void among the voids confirmed in the fifth prototype was 25 μm, and height H was 2.5 μm.

In the sixth prototype, the number N of voids per reference unit area D was 0.

The number N of voids per reference unit area D was evaluated in four grades of A to D. Among these four grades, A or B is good as the evaluation result. The evaluation results are shown below.

TABLE 1

| | First Proto-type | Second Proto-type | Third Proto-type | Fourth Proto-type | Fifth Proto-type | Sixth Proto-type |
|---|---|---|---|---|---|---|
| Number of Voids | 0 | 3 | 9 | 76 | 135 | 0 |
| Peeling Strength (N/cm) | 9.0 | 9.1 | 9.0 | 5.3 | 4.2 | 0.6 |
| Pd Amount (ppm) | 0.7 | 3 | 7 | 291 | 1485 | 0.1 |
| Evaluation of Void | A | A | B | C | D | A |
| Adhesive Force | A | A | A | C | D | E |
| Total | A | A | B | C | D | D |

Since the number of voids is smaller in the first, second and third prototypes than in the fourth and fifth prototypes, circuit defects in a printed circuit having a fine pattern can be suppressed in the first, second and third prototypes, which is preferable. In particular, in the fifth prototype, since the number of voids is very large and the size of the void is also large, circuit defects tend to occur frequently in the fifth prototype, which is disadvantageous.

[Evaluation of Pd Amount]

The amount of Pd was 7 ppm or less in each of the first, second, third, and sixth prototypes in which electroless plating was performed by electrolysis assist. These are Pd which is unintentionally contained in each production line (plating solution tank) and is inevitably introduced. On the other hand, in the fourth prototype and the fifth prototype in which electroless plating was performed using a Pd catalyst, Pd amount each was 291 ppm and 1485 ppm, respectively.

[Evaluation of Adhesive Force of Prototype]

An electrolytic copper plating layer having an average thickness of 20 μm was formed on the second conductor layer of each of the first to sixth prototypes by electrolytic copper plating, and the resultant was used as a sample of an adhesive force evaluation. The adhesive force was evaluated by measuring the peeling strength between the base film made of polyimide and the conductor layer in accordance with JIS-K-6854-2 (1999) "Adhesive-Method for testing peel strength—Part 2:180° peel". To be specific, evaluation was performed using a load cell 50N in a desktop precision tester AGS-X series manufactured by Shimadzu Corporation. The measurement conditions were a stroke length 50 mm and a speed 50 mm/min, and 180° peeling was carried out by gripping the copper foil side where the lead was taken out. The average of the measurement results in the stroke length range of 10 to 50 mm was calculated as the peeling strength. Based on the obtained measurement results, the adhesive force between the base film and the conductor layer was evaluated in the following five grades A to E. Among these five grades, A or B is good as the evaluation result. The evaluation results are shown in Table 1.

A: peeling strength is 9 N/cm or more.

B: peeling strength is 7 N/cm or more and less than 9 N/cm.

C: peeling strength is 5 N/cm or more and less than 7 N/cm.

D: peeling strength is 3 N/cm or more and less than 5 N/cm.

E: peeling strength is less than 3 N/cm.

[Total Evaluation of Number of Voids and Adhesive Force]

The total evaluation of the number of voids and the adhesive force was performed in four grades of A to D. A is the best, and the evaluation decreases in the order from B, C, to D.

In each of the first and second prototypes, the number N of voids per reference unit area. D was small and good (evaluation: A), the adhesive force was also very good (evaluation: A), and the total evaluation of the number of voids and the adhesive force was also determined to be evaluation: A (see Table 1).

In the third prototype, the number N of voids per reference unit area D was small and good (evaluation: B), the adhesive force was also good (evaluation: A), and the total evaluation of the number of voids and the adhesive force was also determined to be evaluation: B (see Table 1).

In the fourth prototype, the adhesive force was low (evaluation: C) and the number of voids was large (evaluation: C). Therefore, the fourth prototype was determined to be evaluation: C as the total evaluation (see Table 1).

In the fifth prototype, the adhesive force was low (evaluation: D) and the number of voids was very large (evaluation: D). Therefore, the fifth prototype was determined to be evaluation: D as the total evaluation (see Table 1).

In the sixth prototype, the number N of voids per reference unit area D was small and very good (evaluation: A), but the adhesive force was very low (evaluation: E). Therefore, the sixth prototype was determined to be evaluation: D as the total evaluation (see Table 1).

It should be understood that the embodiments and examples disclosed herein are illustrative in all respects and are not restrictive. The scope of the present invention is defined not by the above-described meaning but by the claims, and is intended to include meanings equivalent to the claims and all modifications within the scope.

REFERENCE SIGNS LIST 1 base film
1A portion where no void is present
1B portion where void is present
2 conductor layer
3 dispersed portion
4 first conductor layer (sintered layer formed of metal particles, metal sintered layer)
5 second conductor layer (electroless plating layer)
6 third conductor layer
7 fourth conductor layer
8 through-hole
10 void
11 interface
100 electroless plating apparatus
101 electroless plating treatment tank
102 roller (first electrode)
103 counter electrode (second electrode)
105 power supply
200 base material for printed circuit
300 printed circuit
110 base film on which first conductor layer is formed
S11 preparation of conductive ink
S12 applying and firing of conductive ink
S13 pretreatment
S14 electroless plating
S14-1 electrolysis assist
S14A electroless plating (no electric field electrolysis assist)
S15 heat treatment
S16 electroplating
2A, 2B, 2C conductive pattern

The invention claimed is:

1. A base material for a printed circuit, the base material comprising:

a base film containing polyimide as a main component, wherein the base film contains palladium in an amount of from 0.05 ppm to 10 ppm; and a conductor layer formed on at least one surface of the base film, wherein the conductor layer includes a metal sintered layer formed on the base film and an electroless plating layer formed on the metal sintered layer, wherein, on an exposed surface of the base film obtained by removing the conductor layer for evaluation, a number of voids having a maximum width of 5 μm or more in plan view and a height of 1.5 μm or more is 10 or less per a reference unit area of 0.25 mm$^2$ on the exposed surface of the base film, the number being determined from a metallurgical microscope plan view image by image processing to extract void regions and determining per the reference unit area of 0.25 mm$^2$, and the height being measured by laser microscopy, and wherein the base material exhibits a carbon dioxide generation amount of 1 $\mu g/cm^2$ or less when held at 350° C. for 90 minutes under thermogravimetry-mass spectrometry (TG-MS) measurement.

2. The base material for a printed circuit according to claim 1, wherein the conductor layer further includes an electro-plating layer or a metal foil layer on the electroless plating layer.

3. The base material for a printed circuit according to claim 1, wherein the number of voids is 5 or less per the reference unit area.

\* \* \* \* \*